US012631865B2

(12) United States Patent
Rand et al.

(10) Patent No.: US 12,631,865 B2
(45) Date of Patent: May 19, 2026

(54) SYSTEMS AND METHODS FOR TRACKING VIEWING POSITION DURING SAMPLE ANALYSIS

(71) Applicant: LIFE TECHNOLOGIES CORPORATION, Carlsbad, CA (US)

(72) Inventors: Mark Rand, Lynnwood, WA (US); Christopher Martin, Snohomish, WA (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 507 days.

(21) Appl. No.: 18/187,645

(22) Filed: Mar. 21, 2023

(65) Prior Publication Data

US 2023/0305284 A1     Sep. 28, 2023

Related U.S. Application Data

(60) Provisional application No. 63/322,388, filed on Mar. 22, 2022.

(51) Int. Cl.
| | |
|---|---|
| *G02B 21/26* | (2006.01) |
| *G01N 35/00* | (2006.01) |
| *G02B 21/36* | (2006.01) |

(52) U.S. Cl.
CPC ....... *G02B 21/26* (2013.01); *G01N 35/00693* (2013.01); *G01N 35/00871* (2013.01); *G02B 21/361* (2013.01); *G02B 21/368* (2013.01)

(58) Field of Classification Search
CPC .... G02B 21/26; G02B 21/361; G02B 21/368; G02B 21/00; G02B 21/24; G02B 21/34;
(Continued)

(56) References Cited

U.S. PATENT DOCUMENTS

| | | | |
|---|---|---|---|
| 5,216,500 A | 6/1993 | Krummey et al. | |
| 5,497,060 A * | 3/1996 | Juergens, III .......... | B23Q 17/22 318/563 |

(Continued)

FOREIGN PATENT DOCUMENTS

| | | |
|---|---|---|
| CN | 201803700 U | 4/2011 |
| DE | 10 2008 037 876 A1 | 3/2010 |

(Continued)

OTHER PUBLICATIONS

Micro-Manager User's Guide, 2023 https://micro-manager.org/ Micro-Manager_User's_Guide.

(Continued)

*Primary Examiner* — Stephone B Allen
*Assistant Examiner* — Adam W Booher

(57) ABSTRACT

A sample analyzer is configured to obtain first and second stage position data. The first stage position data indicates a first position of a movable stage in a first dimension, and the second stage position data indicates a second position of the movable stage in a second (perpendicular) dimension. The sample analyzer is configured to, based on the first and second stage position data, determine a viewing position of one or more viewing or imaging optics relative to the movable stage. The sample analyzer is configured to display a vessel map, which comprises a visual representation of a sample vessel associated with the movable stage. The sample analyzer is configured to display a viewing position marker overlaid on the vessel map. The viewing position marker indicates the viewing position of the one or more viewing or imaging optics relative to the sample vessel as represented by the vessel map.

21 Claims, 8 Drawing Sheets

(58) Field of Classification Search

CPC .... G02B 21/36; G02B 21/362; G02B 21/367; G01N 35/00693; G01N 35/00871; G01N 35/00732; G01N 35/02; G01N 2035/00772; G01N 2035/00792; G01N 2035/00801; G01N 2035/00891; G01N 2035/0091; G01N 2035/0491; G01N 2035/0493; G01N 2035/0494

See application file for complete search history.

(56) References Cited

U.S. PATENT DOCUMENTS

| | | | |
|---|---|---|---|
| 5,557,456 A * | 9/1996 | Garner ................. | G02B 21/367 |
| | | | 359/383 |
| 6,226,392 B1 | 5/2001 | Bacus et al. | |
| 7,327,901 B2 | 2/2008 | Karlsson et al. | |
| 7,940,998 B2 | 5/2011 | Rainer | |
| 8,537,462 B2 | 9/2013 | Seifert et al. | |
| 9,739,994 B1 | 8/2017 | Loeb | |
| 10,145,857 B2 | 12/2018 | Pollack et al. | |
| 10,948,706 B2 | 3/2021 | Ando et al. | |
| 11,636,627 B2 | 4/2023 | Siegel et al. | |
| 2004/0218804 A1 * | 11/2004 | Affleck ............. | G02B 21/0016 |
| | | | 382/141 |
| 2011/0216183 A1 | 9/2011 | Yokomachi | |
| 2018/0136451 A1 | 5/2018 | Soenksen | |
| 2019/0122026 A1 * | 4/2019 | Acher ................. | H04N 17/002 |
| 2021/0373042 A1 * | 12/2021 | Cherubini ............. | G01N 35/04 |

FOREIGN PATENT DOCUMENTS

| | | | | |
|---|---|---|---|---|
| GB | 2 411 249 A | 8/2005 | | |
| KR | 10-1781670 B1 | 9/2017 | | |
| WO | WO-2023183323 A1 * | 9/2023 | ....... | G01N 35/00871 |

OTHER PUBLICATIONS

"MS2000, MFC2000, and RM2000 Operation Front Panel Controls, XY Joystick", Applied Scientific Instrumentation, 2012 http://asiimaging.com/docs/ms2000_operation.

* cited by examiner

1

SYSTEMS AND METHODS FOR TRACKING VIEWING POSITION DURING SAMPLE ANALYSIS

CROSS REFERENCE TO RELATED APPLICATIONS

This application claims the benefit of priority of U.S. Provisional Application No. 63/322,388, entitled "System and Methods for Tracking Viewing Point Position During Sample Analysis," filed on Mar. 22, 2022, the content of which is incorporated by reference herein in its entirety.

FIELD OF INVENTION

The present disclosure relates to the field of microscopy, in particular systems and methods for tracking viewing position during an analysis.

BACKGROUND

Microscopy is concerned with observing small, often microscopic, objects, such as live cells. Live cell samples are often loaded into a sample vessel, which is then positioned on a microscope for viewing and/or imaging. Some sample vessels include sample wells for receiving live cell samples and retaining them in separation from other live cell samples within the same sample vessel. To allow users to view different sample wells of a sample vessel, many microscopes are configured with a movable stage. After securing a sample vessel to a movable stage, a user may adjust the position of the movable stage to arrange different sample wells for viewing/imaging via the microscope objective.

Sample vessels can include large samples areas and/or large numbers of wells, such as 96 or more wells. Consequently, users analyzing a sample with a microscope can lose track of which portion(s) of the sample vessel they are observing and/or have already observed, particularly as the user repeatedly adjusts a movable stage of the microscope during an imaging/analysis session. Such occurrences can reduce sample analysis efficiency and can result in users failing to recall where structures of interest can be found in a sample vessel.

Accordingly, there is an ongoing need and desire for improved systems and methods for tracking viewing position during sample analysis.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF THE INVENTION

Implementations of the present disclosure extend at least to systems and methods for tracking viewing position during sample analysis.

Some embodiments provide a sample analyzer that includes a movable stage. The movable stage includes a vessel holder configured to receive a sample vessel and a stage position adjuster configured to translate the movable stage in at least a first dimension and a second dimension that is perpendicular to the first dimension. The movable stage also includes a first position encoder configured to generate first output indicating a first position of the movable stage in the first dimension and a second position encoder configured to generate second output indicating a second position of the movable stage in the second dimension.

Some embodiments provide a sample analyzer that includes a display, one or more processors, and one or more hardware storage devices storing instructions that are executable by the one or more processors to configure the sample analyzer to perform actions. The actions include obtaining first and second stage position data. The first stage position data indicates a first position of a movable stage in a first dimension, and the second stage position data indicates a second position of the movable stage in a second dimension that is perpendicular to the first dimension. The actions further include, based on the first and second stage position data, determining a viewing position of one or more viewing or imaging optics relative to the movable stage. The actions further include displaying a vessel map on the display. The vessel map comprises a visual representation of a sample vessel associated with the movable stage. The actions further include displaying a viewing position marker overlaid on the vessel map. The viewing position marker indicates the viewing position of the one or more viewing or imaging optics relative to the sample vessel as represented by the vessel map.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings.

DETAILED DESCRIPTION

Implementations of the present disclosure extend at least to systems and methods for tracking viewing position during sample analysis.

The disclosed embodiments may be implemented to address various shortcomings associated with at least some conventional sample analysis systems that may include, but are not limited to conventional microscope systems with a movable stage with manual controls. For example, disclosed embodiments may obtain positional data associated with a movable stage of a sample analyzer (e.g., a microscope system) using one or more positional encoders. The positional data may be used to determine a viewing position of a viewing or imaging optic (e.g., an objective of the microscope system) relative to the movable stage (or relative to a sample vessel positioned within the movable stage). Disclosed embodiments may display a vessel map that corresponds to a sample vessel positioned on the movable stage, and a viewing position marker may be displayed in combination with the vessel map to illustrate positioning of the viewing or imaging optic relative to the sample vessel (as represented by the vessel map).

By displaying a vessel map (representative of a sample vessel positioned on a movable microscope stage) in combination with a viewing position marker (representing a viewing position of a viewing or imaging optic relative to the sample vessel), disclosed embodiments may provide users with an intuitive representation of the relative positioning between the microscope objective and various portions of the sample vessel positioned within the microscope. For instance, a vessel map may comprise visual representations of sample wells or other sample holding structures associated with a particular type of sample vessel positioned on the microscope stage. Thus, by displaying the vessel map in combination with the viewing position marker, disclosed embodiments may communicate to users the viewing position of the microscope objective relative to particular sample wells or other sample holding structures of the sample vessel. Users may thus avoid becoming lost or disoriented when using a microscope with a movable stage to view samples.

At least some disclosed embodiments include or are configured to perform acts such as saving viewing positions of interest, facilitating guided navigation to saved viewing positions of interest, displaying sample well markers and/or embedding sample well markers to captured image files, and/or others. Such embodiments may be implemented to further improve user experiences when using a microscope to analyze/capture samples.

Attention will now be directed to FIGS. 1 through 8, which provide various supporting illustrations related to the disclosed embodiments.

Figure 1:
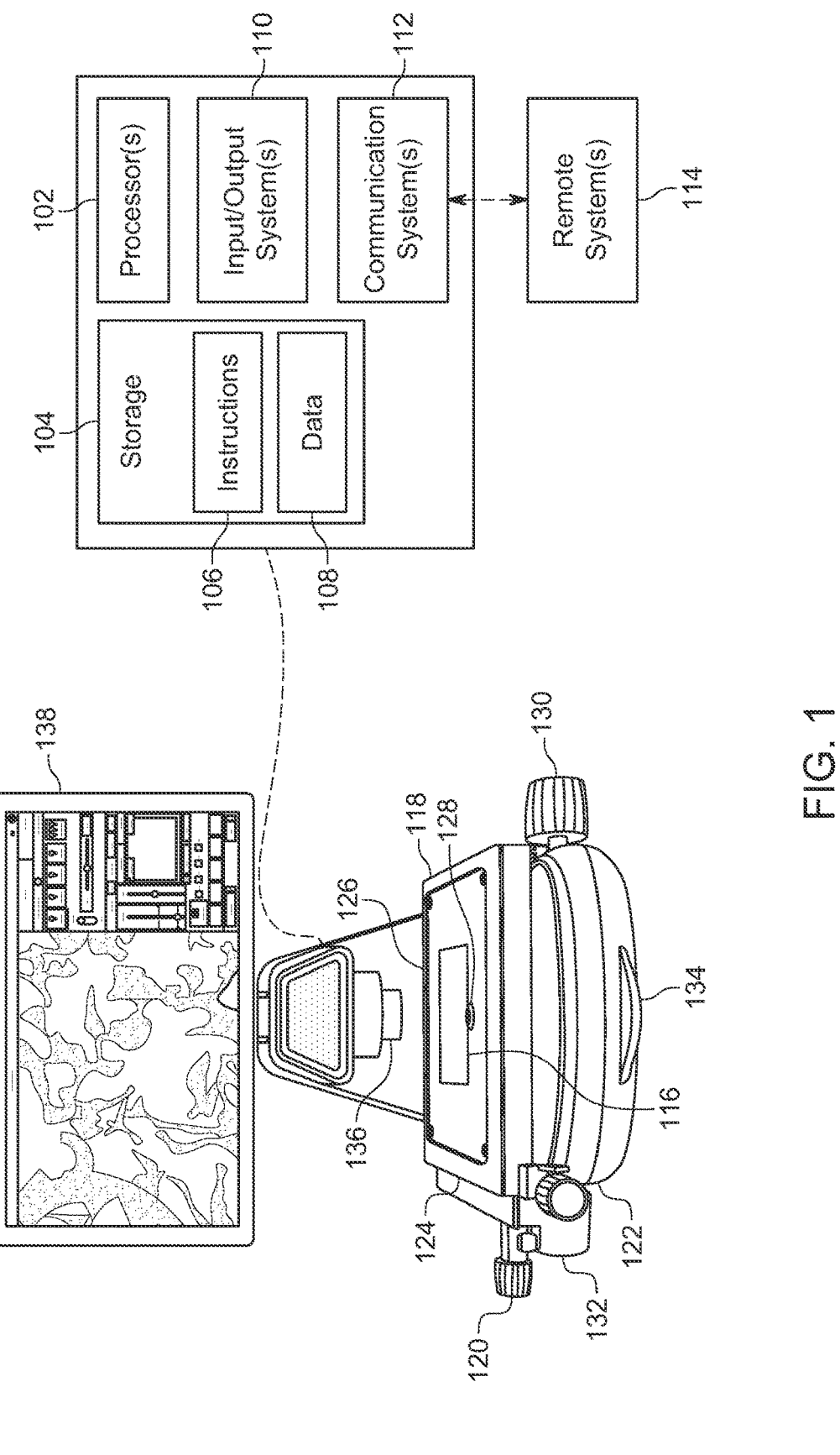
FIG. 1 illustrates example components of a sample analyzer, in accordance with implementations of the present disclosure.

Example Systems and Techniques for Tracking
Viewing Position During Sample Analysis FIG. 1 illustrates various example components of a sample analyzer 100 that may be used to implement one or more disclosed embodiments. Although FIG. 1 illustrates a sample analyzer 100 as including particular components, one will appreciate, in view of the present disclosure, that a sample analyzer 100 may comprise any number of additional or alternative components. Furthermore, FIG. 1 depicts the sample analyzer 100 as a microscope configured for performing cellular analysis. One will appreciate, in view of the present disclosure, that the principles disclosed herein are not limited to the particular form and/or features of the sample analyzer 100 shown in FIG. 1. For example, the principles disclosed herein may be implemented in conjunction with any type of phase contrast, fluorescent, holotomography, and/or other microscopy systems.

FIG. 1 illustrates that a sample analyzer 100 may include processor(s) 102, storage 104, input/output system(s) 110 (I/O system(s) 110), and communication system(s) 112. The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 112 or otherwise), or some combination thereof. Additional details related to processors (e.g., processor(s) 102), computer storage media (e.g., storage 104), and other computer components will be provided hereinafter.

The processor(s) 102 may be configured to execute instructions 106 stored within storage 104 to perform certain actions associated with tracking viewing position for sample analysis. The actions may rely at least in part on data 108 (e.g., stage position data, etc.) stored on storage 104 in a volatile or non-volatile manner.

In some instances, the actions may rely at least in part on communication system(s) 112 for receiving data from remote system(s) 114, which may include, for example, separate microscope systems, computing devices, sensors, and/or others. The communications system(s) 112 may comprise any combination of software or hardware components that are operable to facilitate communication between on-system components/devices and/or with off-system components/devices. For example, the communications system(s) 112 may comprise ports, buses, or other physical connection apparatuses for communicating with other devices/components. Additionally, or alternatively, the communications system(s) 112 may comprise systems/components operable to communicate wirelessly with external systems and/or devices through any suitable communication channel(s), such as, by way of non-limiting example, Bluetooth, ultra-wideband, WLAN, infrared communication, and/or others.

Furthermore, FIG. 1 illustrates that a sample analyzer 100 may comprise or be in communication with I/O system(s) 110. I/O system(s) 110 may include any type of input or output device such as, by way of non-limiting example, a touch screen, a mouse, a keyboard or button interface, a controller, and/or others, without limitation.

FIG. 1 illustrates various additional components of the sample analyzer 100. For example, FIG. 1 illustrates a vessel holder 116 on a movable stage 118. The vessel holder 116 is configured to receive a sample vessel, such as a sample vessel for receiving and retaining live/dead cell samples for analysis using the sample analyzer 100. As noted above, a sample vessel may comprise a sample slide and/or one or more sample wells for receiving samples. Example, non-limiting sample vessel configurations include 1-slide, 2-slide, 6-well, 12-well, 24-well, 48-well, 96-well, 384-well, and/or others. In some implementations, the vessel holder 116 includes a retention member (e.g., a lateral-push retention clip or other biasing member) that retains the sample vessel at a final position within the vessel holder 116, thereby securing the sample vessel relative to the movable stage 118.

In some implementations, the movable stage 118 of the sample analyzer 100 is position-adjustable to facilitate imaging of different portions of a sample vessel retained within the vessel holder 116 of the movable stage. In this regard, the sample analyzer 100 may comprise a stage position adjuster configured to translate the movable stage 118 in at least 2 dimensions (e.g., an x-dimension, and a y-dimension that is perpendicular to the x-dimension). In the example shown in FIG. 1, the sample analyzer 100 comprises an x-adjustment knob 120 and a y-adjustment knob 122. The x-adjustment knob 120 is rotatable to facilitate planar translation of the movable stage 118 in a first direction/dimension (e.g., a front-back direction), whereas the y-adjustment knob 122 is rotatable to facilitate planar translation of the movable stage 118 in a second direction/dimension that is perpendicular to the first direction/dimension (e.g., a right-left direction).

One will appreciate, in view of the present disclosure, that the particular hardware configuration of the stage position adjuster of the sample analyzer 100 of FIG. 1 is provided by way of example only and is non-limiting. For example, one or more components of a movable stage 118 may be adjustable utilizing one or more sliders or other adjustment components. Furthermore, although the movable stage 118 of the sample analyzer 100 of FIG. 1 is adjustable by user manipulation of physical elements of the sample analyzer, a movable stage 118 of a sample analyzer may be adjusted by one or more motor systems that are electrically driven (e.g., to additionally or alternatively facilitate automated stage position adjustment based on input instructions).

The example sample analyzer 100 of FIG. 1 also includes position tracking sensors. In particular, FIG. 1 depicts a first position encoder 124 and a second position encoder 126. The first position encoder 124 is configured to generate sensor output that indicates a position (or change in position) of the movable stage 118 in the first direction/dimension (e.g., the x-dimension), whereas the second position encoder 126 is configured to generate sensor output that indicates a position (or change in position) of the movable stage in the second direction/dimension (e.g., the y-dimension). In this way, as the positioning of the movable stage 118 is adjusted (e.g., using the x-adjustment knob 120 and/or the y-adjustment knob 122), the first position encoder 124 and the second position encoder 126 provide output that facilitates tracking of the updated position of the movable stage 118.

The first position encoder 124 and/or the second position encoder 126 may take on various forms. For instance, in some implementations, the first position encoder 124 and/or the second position encoder 126 comprise incremental encoders that output sensor data indicative of changes in position (e.g., translation distance). When incremental encoders are used, to facilitate consistent position tracking between power cycles of the sample analyzer 100, a calibration step may be performed between power cycles by bringing (or directing the user to bring) the movable stage 118 to a known reference or starting position (e.g., a particular corner position). After bringing the movable stage 118 to a known position, changes in position as detected by the incremental encoders may be applied to the initial or previous positioning of the movable stage 118 to determine the updated position of the movable stage 118.

In some implementations, the first position encoder 124 and/or the second position encoder 126 comprise absolute encoders that output sensor data indicative of absolute position. For example, positional output of the absolute encoders may be correlated with particular stage positions in a one-to-one manner such that each positional output of the absolute encoders is indicative of a respective particular stage position (in respective dimensions). In such implementations, consistent stage position tracking may be achieved without performing a calibration step between each power cycle of the sample analyzer 100.

In some implementations, the first position encoder 124 and/or the second position encoder 126 are implemented as linear encoders. For instance, the example of FIG. 1 depicts the first position encoder 124 and the second position encoder 126 as comprising respective linear elements that run along the first and second dimensions (e.g., the x-dimension and the y-dimension). These linear elements may comprise features that are detectable by a corresponding sensor and that are indicative of particular positions or changes in position (when detected by the corresponding sensor). Although the encoder components shown in FIG. 1 are mounted to the exterior of the sample analyzer 100, one will appreciate, in view of the present disclosure, that such components may be mounted internally on the sample analyzer 100.

In some implementations, the first position encoder 124 and/or the second position encoder 126 are implemented as rotary encoders and are therefore positioned on or within rotatable elements associated with translation of the movable stage 118 (e.g., the x-adjustment knob 120 and the y-adjustment knob 122). Whether implemented as linear encoders or rotary encoders, the first position encoder 124 and/or the second position encoder 126 may comprise magnetic encoders, optical encoders, capacitive encoders, and/or others.

FIG. 1 furthermore illustrates an objective 128 of the sample analyzer 100. The objective 128 comprises one or more lenses that is/are configured to focus light that is reflected or scattered from a sample to form an image on a detector (e.g., an image sensor or a human eye). For example, as noted above, a user may adjust the position of the movable stage 118 when a sample vessel is positioned thereon to move a region of interest of the sample vessel over the objective 128. An illuminator of the sample analyzer 100 may emit light that is directed by a condenser 136 onto the region of interest of the sample vessel, and the light may scatter or reflect off of the region of interest toward the objective 128 for image formation/detection.

The focus position of the objective 128 shown in FIG. 1 is adjustable via focus knobs 130 and 132. In some instances, a sample analyzer 100 includes multiple objectives, which may be selected via an objective selection wheel 134 or other similar device for switching objective lenses (e.g., a lens slider). One will appreciate, in view of the present disclosure, that the sample analyzer 100 may comprise any number of optics, filters, detectors, focus adjusters, illuminators, and/or other components to facilitate image formation and/or image capture of samples.

FIG. 1 furthermore illustrates the sample analyzer 100 as comprising or being in communication with a display 138. The particular type and form of the display 138 shown in FIG. 1 is not limiting of the present disclosure. The processor(s) 102 may execute instructions 106 that are operable to cause one or more graphical user interfaces and/or other visual elements to be presented on the display 138. For example, captured images of samples acquired by the sample analyzer 100 may be presented on the display 138 responsive to execution of instructions 106 by the processor(s) 102. As will be described in more detail hereinbelow, visual representations of viewing position relative to a sample vessel may be generated and/or presented on a display 138 to facilitate viewing position tracking.

Figure 2:
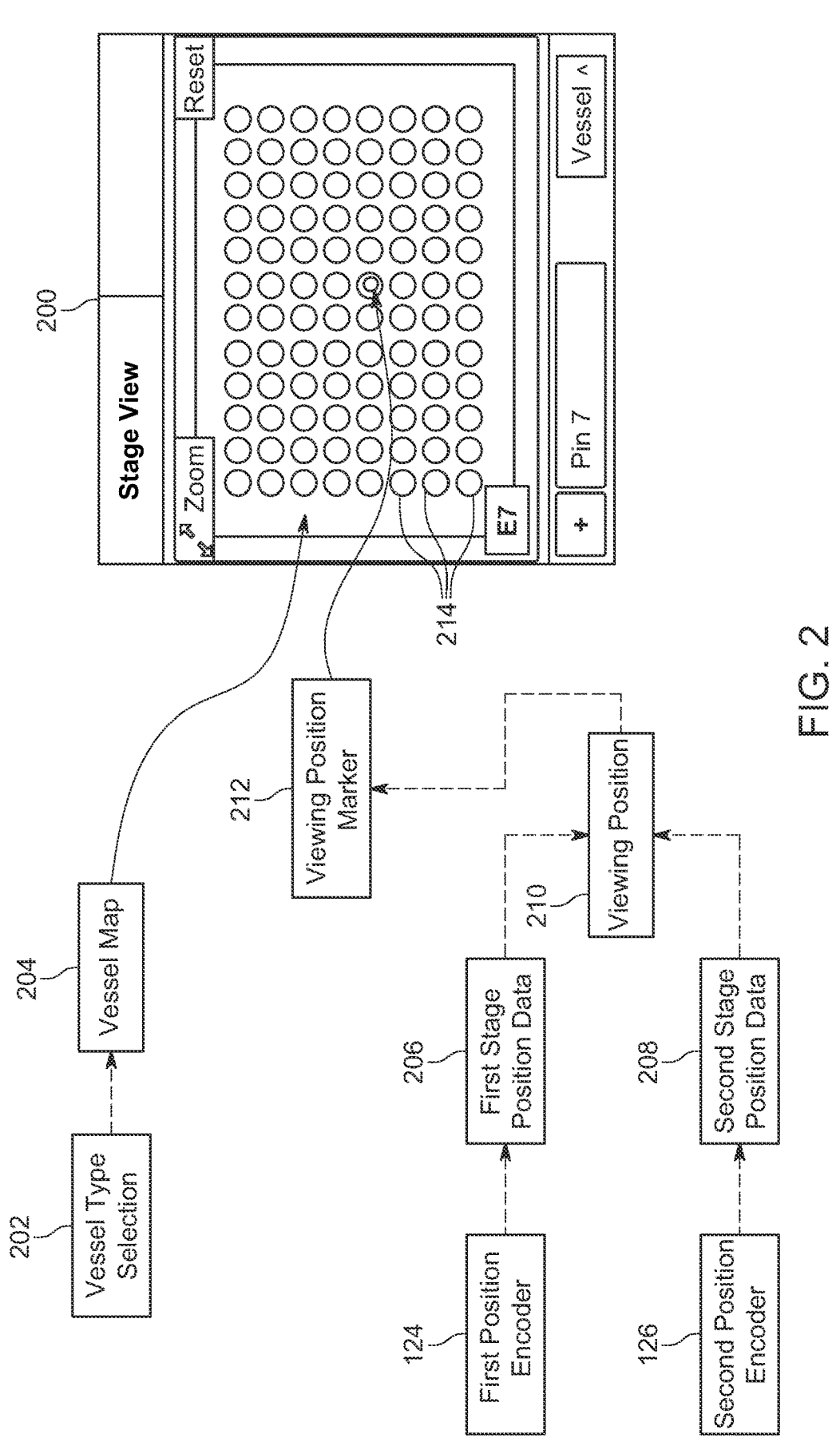
FIG. 2 illustrates an example graphical user interface depicting a viewing position marker and a vessel map, in accordance with implementations of the present disclosure.

FIG. 2 illustrates an example graphical user interface 200 depicting a viewing position marker 212 and a vessel map 204, in accordance with implementations of the present disclosure. The graphical user interface 200 may be generated or rendered responsive to execution of instructions 106 using processor(s) 102. FIG. 2 conceptually represents a vessel type selection 202, which may be obtained automatically or based on user input. For example, a user may place a sample vessel on a vessel holder 116 of a movable stage 118 of a sample analyzer 100 and may provide user input at the sample analyzer (e.g., via I/O system(s) 110) indicating a vessel type associated with the sample vessel. For instance, a user may respond to a user interface prompt to make a selection from available vessel types including 1-slide, 2-slide, 6-well, 12-well, 24-well, 48-well, 96-well, 384-well, blank map, and/or others. In other instances, the vessel type selection 202 is obtained automatically, such as by detecting or sensing physical features/aspects and/or scannable elements of the sample vessel when it is placed on or within the vessel holder 116.

Whether obtained automatically or responsive to user input, the vessel type selection 202 may be used to obtain a vessel map 204, as indicated in FIG. 2 by the dashed arrow extending from the vessel type selection 202 to the vessel map 204. The vessel map 204 visually represents one or more features of the sample vessel selected according to the vessel type selection 202 (e.g., the sample vessel positioned on or within the vessel holder 116 of the movable stage 118). A plurality of vessel maps may be stored in storage 104 for access responsive to a vessel type selection 202.

In the example of FIG. 2, the vessel map 204 depicts a plurality of wells 214. The number, size, and arrangement of wells 214 (or other features) shown on the vessel map 204 may depend on the vessel type selection 202. For instance, the vessel map 204 of FIG. 2 includes 96 wells 214 and may have been selected for display in the graphical user interface 200 based on the vessel type selection 202 indicating that a 96-well sample vessel is positioned within the vessel holder 116 of the movable stage 118.

As noted above, the viewing position marker 212 may be displayed in association with the vessel map 204 to indicate a viewing position of one or more viewing or imaging optics of the sample analyzer 100 relative to a sample vessel positioned on or within the sample analyzer 100. FIG. 2 conceptually depicts the first position encoder 124 and the second position encoder 126, which correspond to the first position encoder 124 and the second position encoder 126 shown and described hereinabove with reference to FIG. 1. FIG. 2 also shows first stage position data 206 obtained by the first position encoder 124 and second stage position data 208 obtained by the second position encoder 126. The format of the first and second stage position data 206 and 208 may take on any suitable form, such as quadrature output.

The first stage position data 206 and the second stage position data 208 comprise or are based on sensor data obtained by the first position encoder 124 and the second position encoder 126, respectively. In this regard, as noted above, the first stage position data 206 and the second stage position data 208 may indicate the position, or change in position, of the movable stage 118 (and therefore the sample vessel positioned on or within the vessel holder 116 of the movable stage 118). For instance, the first stage position data 206 may indicate absolute position or translation distance along a first dimension (e.g., the x-dimension), whereas the second stage position data 208 may indicate absolute position or translation distance along a second dimension (e.g., the y-dimension). Where the data indicates translation distance, the translation distance may be used in combination with a starting reference position (e.g., according to a calibration step) to determine stage and sample vessel position.

Based on the position of the movable stage 118 (and, by extension, the sample vessel positioned within the vessel holder 116 of the movable stage 118) indicated by the first stage position data 206 and the second stage position data 208, a viewing position 210 may be determined for the sample analyzer 100 (as depicted in FIG. 2 by the dashed arrows extending from the first position data 206 and the second stage position data 208 to the viewing position 210). The viewing position 210 may comprise a positioning of one or more viewing or imaging optics of a sample analyzer 100 (e.g., an objective 128) relative to a sample vessel associated with the sample analyzer 100.

For example, as noted above with reference to FIG. 1, the objective 128 may be fixed to a known position on the sample analyzer 100 when the objective 128 is prepared for imaging (e.g., when a particular objective 128 is selected via the objective selection wheel 134). Information related to the known position of the objective 128 may be used to determine the positioning of the movable stage 118 and the sample vessel thereof relative to the objective 128. For instance, where the first stage position data 206 and the second stage position data 208 indicate per-dimension translation distance, an offset may be determined between the reference position for calibration of the movable stage 118 and the known position of the objective 128 on the sample analyzer 100. This offset may be used in combination with the received per-dimension translation distance to determine updated relative positioning between the objective 128 and the sample holder positioned on the movable stage 118. Where the first stage position data 206 and the second stage position data 208 indicate absolute position, the absolute position data may be used in combination with the known position of the objective 128 to determine updated relative positioning between the objective 128 and the sample holder positioned on the movable stage 118.

The viewing position 210 may be used to generate a viewing position marker 212 (indicated in FIG. 2 by the dashed arrow extending from the viewing position 210 to the viewing position marker 212). As shown in FIG. 2, the viewing position marker 212 may be displayed on the graphical user interface 200 (e.g., on a display 138) to communicate the viewing position 210 of one or more viewing or imaging optics (e.g., the objective 128) relative to portions of the sample vessel, as represented by the vessel map 204. For example, the graphical user interface 200 depicts the vessel map 204 with the viewing position marker 212 overlaid on the vessel map 204, thereby communicating the position of the objective 128 relative to the wells 214 of the sample vessel represented by the vessel map 204. In this way, users may readily ascertain which of the wells 214 the objective 128 is arranged to image. For sample vessels that do not include wells, such functionality may assist users in readily ascertaining which portion of the sample vessel is currently being imaged by the objective 128.

As the position of the sample vessel and movable stage 118 are updated relative to the objective 128 (e.g., by manipulation of the x-adjustment knob 120 and/or the y-adjustment knob 122), updated first stage position data 206 (in the first dimension) and/or updated second stage position data 208 (in the second dimension) may be obtained (e.g., based on output of the first position encoder 124 and/or the second position encoder 126). The updated first and second stage position data 206 and 208 may be used to generate an updated viewing position 210. The positioning of the viewing position marker 212 may thus be updated based on the updated viewing position 210 in real-time, thereby providing users with an intuitive tool for ascertaining the viewing position associated with the sample analyzer 100.

One will appreciate, in view of the present disclosure, that the particular form of the viewing position marker 212 shown in FIG. 2 is not limiting of the present disclosure, and that a viewing position marker 212 may take on any suitable form.

Figure 3:
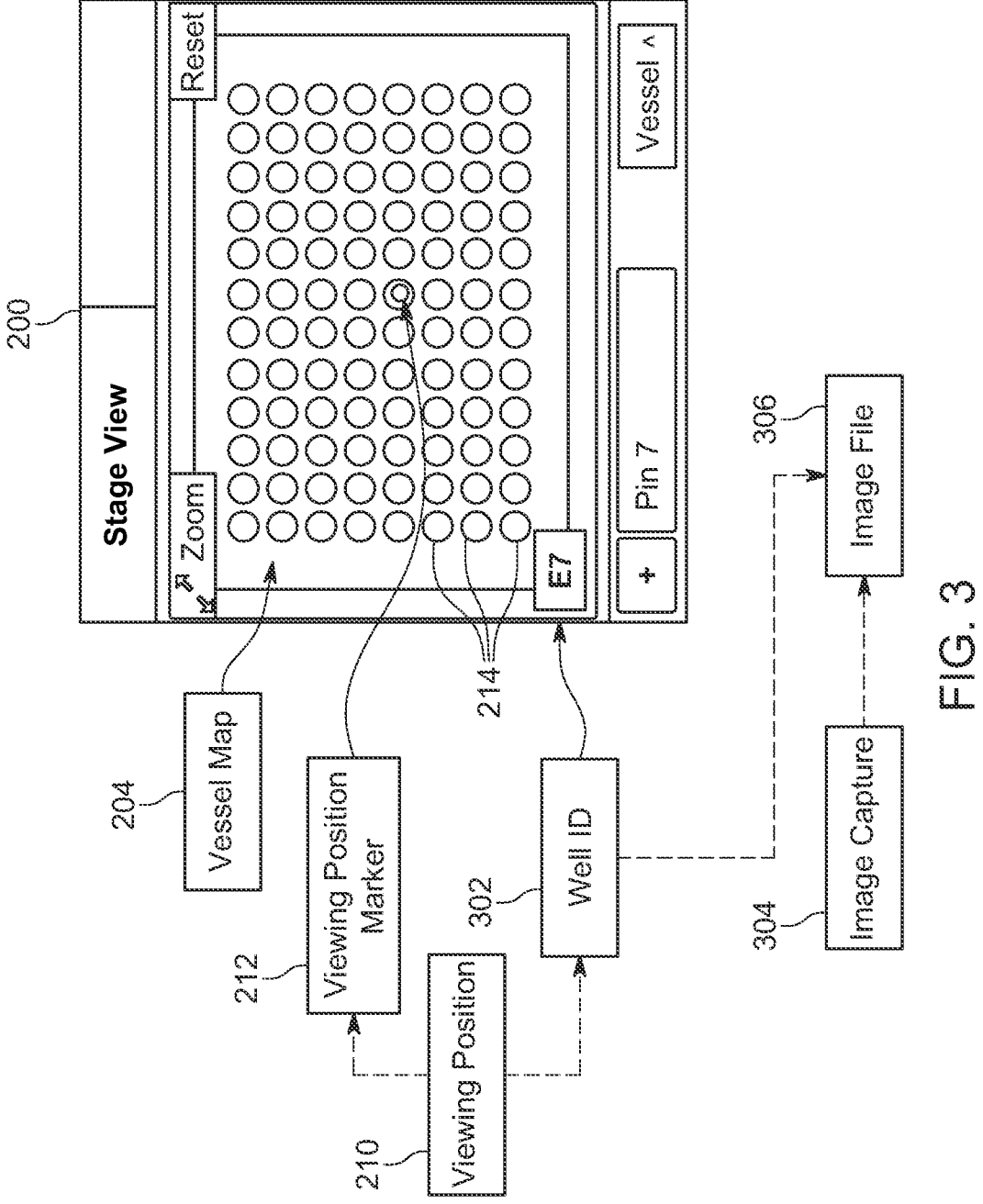
FIG. 3 illustrates an example graphical user interface depicting a sample well identifier associated with a sample well of a sample vessel, in accordance with implementations of the present disclosure.

FIG. 3 illustrates the example graphical user interface 200 from FIG. 2. In addition to the vessel map 204, the wells 214, and the viewing position marker 212, FIG. 3 depicts a well identifier 302 (well ID 302). The well ID 302 may be determined based on the viewing position 210 of the one or more viewing or imaging optics (e.g., the objective 128) discussed above. For example, the positions of particular wells 214 on the sample vessel may be predefined. Thus, the viewing position 210 of the objective 128 relative to the sample vessel may be used to determine the positioning of the objective 128 relative to the known positions of particular wells 214 of the sample vessel.

Each well of a particular sample vessel configuration may be pre-assigned a particular identifier value (e.g., an identifier with two elements, with one indicating x-dimension positioning and another indicating y-dimension positioning). When the viewing position 210 of the objective 128 corresponds with the known position of a particular well of the wells 214 of the sample vessel (e.g., when the viewing position 210 overlaps with at least a portion of a particular well, or where the viewing position 210 is within a threshold proximity to a particular well), the identifier value for the particular well may be displayed as the well ID 302.

In the example shown in FIG. 3, the viewing position 210 (as indicated by the viewing position marker 212) is within the area defined by a particular well with an assigned well identifier of "E7" (indicating that the well is in the fifth row (indicated by the "E" of "E7") of the seventh column (indicated by the "7" of "E7")). Thus, the well ID 302 displayed in the graphical user interface 200 is "E7." Such functionality may allow users to readily ascertain which sample well the objective 128 of the sample analyzer 100 is arranged to image, which may assist users in making and/or recording observations and associating them with particular portions of the sample vessel.

FIG. 3 depicts that, in some implementations, image capture 304 operations may be performed by the sample analyzer 100 to save an image file 306 of that depicts one or more specimens of the sample vessel on the movable stage 118. In some instances, when image capture 304 is performed, the well ID 302 indicates the particular well of the sample vessel that is aligned with the viewing position 210 of the objective 128 during the image capture 304. Thus, in some implementations, the well ID 302 is automatically embedded into the image file 306 (as indicated in FIG. 3 by the dashed line extending from the well ID 302 to the image file 306). The well ID 302 may be embedded into the image file 306 in various ways, such as by adding the well ID 302 to the filename of the image file 306, overlaying or adding image data representative of the well ID 302 onto a portion of the image file 306, adding the well ID 302 to metadata of the image file 306, and/or others. Such functionality may allow users to readily ascertain which sample well of a particular sample vessel is represented by an image file 306 when subsequently reviewing the image file 306 after a sample analysis session. In some instances, additional or alternative information is embedded into the image file 306, such as an x-position, y-position, and/or z-position (e.g., focus position and/or configuration) associated with the viewing position 210.

Figure 4:
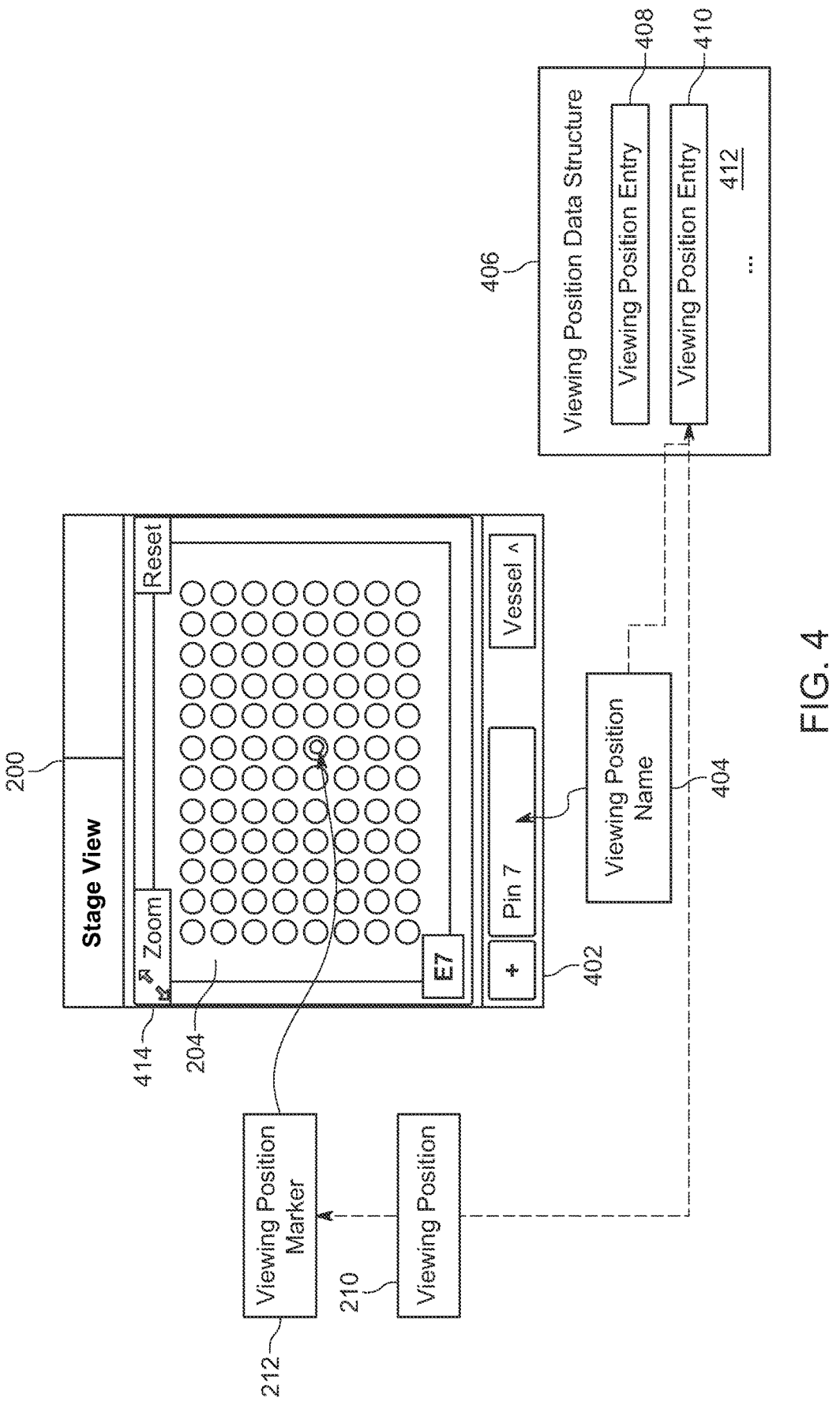
FIG. 4 illustrates a conceptual representation of saving a viewing position, in accordance with implementations of the present disclosure.

FIG. 4 illustrates a conceptual representation of saving a viewing position, in accordance with implementations of the present disclosure. FIG. 4 illustrates the graphical user interface 200 of FIGS. 2 and 3. In addition to the vessel map 204 and the viewing position marker 212 based on the viewing position 210 discussed above, FIG. 4 shows that the graphical user interface 200 includes a save viewing position control 402. The save viewing position control 402 of FIG. 4 is illustrated as a selectable button on the graphical user interface 200. For example, a user may provide input at an input device (e.g., a computer mouse, a touchscreen, etc.) that is directed to the save viewing position control 402 to trigger a save viewing position operation. One will appreciate, in view of the present disclosure, that a save viewing position operation may be triggered in other ways within the scope of the present disclosure. For example, a save viewing position operation may additionally or alternatively be activatable in response to keystroke input, button input, gesture input, voice input, and/or other means. The principles discussed herein related to saving a viewing position may be applied however a save viewing position operation is triggered.

A save viewing position operation may be triggered while the one or more viewing or imaging optics of the sample analyzer 100 (e.g., the objective 128) is/are arranged in accordance with the viewing position 210 relative to the sample vessel positioned within the vessel holder 116 of the movable stage 118. In response to triggering of a save viewing position operation (e.g., by activation of the save viewing position control 402), the viewing position 210 may thus become saved or added as a viewing position entry of a viewing position data structure 406, as indicated in FIG. 4 by the dashed arrow extending from the viewing position 210 to a viewing position entry 410 of the viewing position data structure 406. A viewing position data structure 406 may comprise any number of entries as indicated by the multiple viewing position entries 408 and 410 and the ellipsis 412 represented in FIG. 4. The viewing position data structure 406 may take on any suitable data format and may be stored in any suitable manner (e.g., on storage 104 of the sample analyzer 100, and/or on storage of one or more remote systems). Viewing position entries stored within the viewing position data structure 406 may comprise an x-position, y-position, z-position, and/or other imaging/viewing settings associated with viewing positions for which viewing position entries are created.

Different viewing position entries of a viewing position data structure 406 may be assigned different names to allow users to subsequently differentiate among different saved viewing positions. For example, FIG. 4 illustrates an entry space for a viewing position name 404, where a user may enter a name for a saved viewing position entry in a viewing position data structure 406 (e.g., as indicated in FIG. 4 by the dashed line extending from the viewing position name 404 to the viewing position entry 410 of the viewing position data structure 406). The text entered in the entry space for the viewing position name 404 may be automatically associated with a saved viewing position upon activation of a save viewing position operation (e.g., selection of the save viewing position control 402). In some instances, default names are auto-populated into the entry space for the viewing position name 404. The default names may be based, for example, on the ordering of saved viewing position entries (e.g., "Pin 1" for a first saved viewing position entry, "Pin 2" for a second saved viewing position entry, etc.).

In some implementations, the viewing position data structure 406 (or one or more representations thereof) is accessible to enable users to revisit saved viewing positions represented in the viewing position data structure 406. In some instances, representations of the viewing position entries of a viewing position data structure 406 are automatically displayed (e.g., on a display 138 in combination with the graphical user interface 200) upon the saving of the viewing position entries.

In some instances, the viewing position data structure is accessed by entering or selecting a control that facilitates access thereto. For instance, the example graphical user interface 200 of FIG. 4 includes a zoom control 414, which may be selected to trigger display of a zoomed representation of the vessel map in combination with a representation of the viewing position data structure 406.

Figure 5:
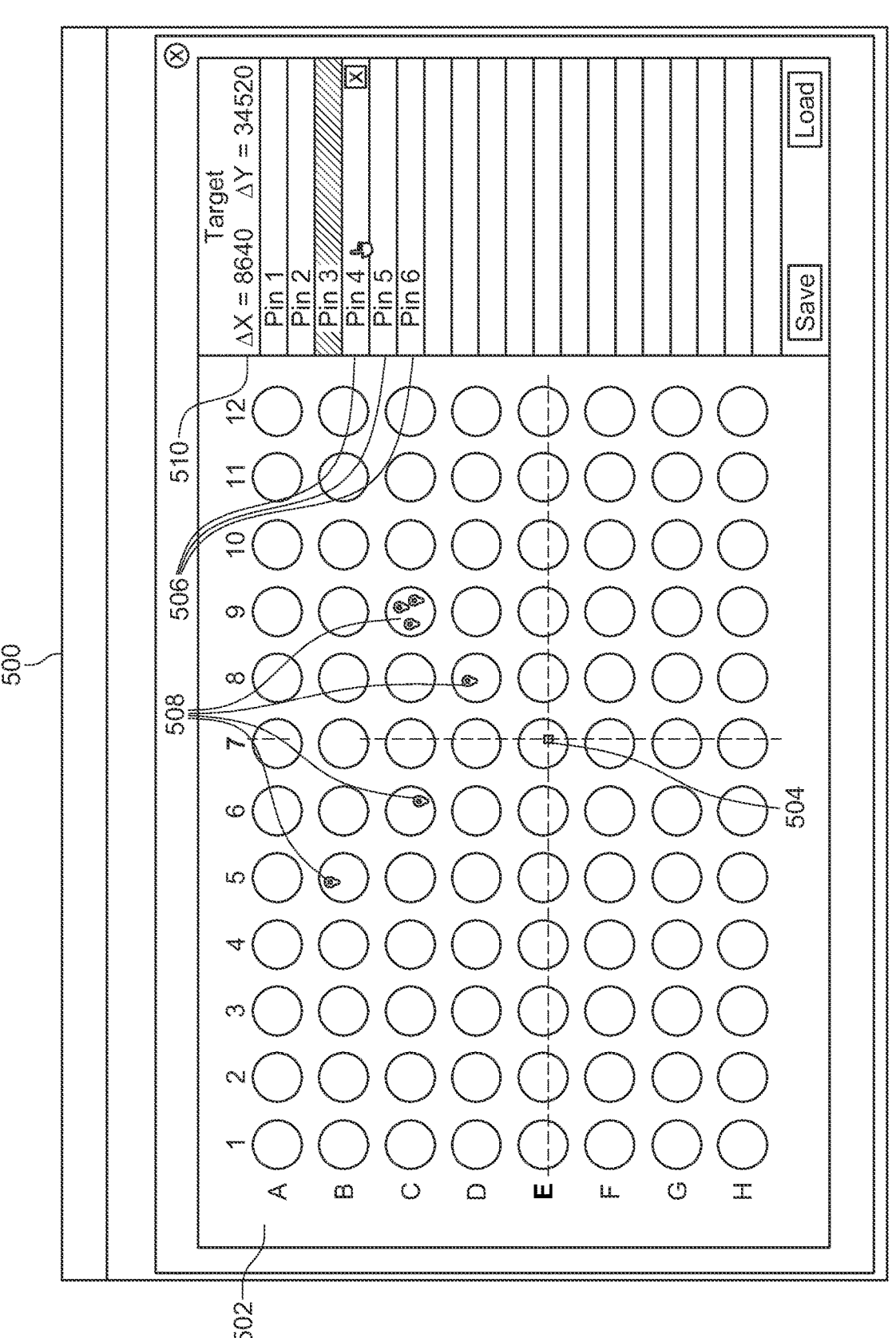
FIGS. 5 through 7 illustrate example graphical user interfaces depicting vessel maps, viewing position markers, and viewing position entries, in accordance with implementations of the present disclosure.

FIG. 5 illustrates an example graphical user interface 500 that provides a vessel map 502 that comprises a zoomed or alternative representation of the vessel map 204 heretofore described with reference to FIGS. 2 through 4. In some instances, the vessel map 502 comprises additional details or features as compared with the vessel map 204 discussed previously. For example, as shown in FIG. 5, the vessel map 502 includes well row identifiers ("A", "B", "C", etc.) and well column identifiers ("1", "2", "3", etc.) to facilitate user navigation and/or analysis among the various wells of the sample vessel represented by the vessel map 502. The example graphical user interface 500 of FIG. 5 also depicts a viewing position marker 504 that includes guides that extend outward from the viewing position marker 504 in the x-dimension and the y-dimension. The guides may assist users in readily identifying position of the viewing position marker 504 relative to the array of wells of the sample vessel represented by the vessel map 502.

The graphical user interface of FIG. 5 also depicts viewing position entries 506 and viewing position entry markers 508. The viewing position entries 506 of FIG. 5 are depicted as an array of list entries, with the entries including names such as "Pin 1," "Pin 2," "Pin 3," etc., corresponding to different viewing position entries that were saved or added to a viewing position data structure 406 via a save viewing position operation (e.g., viewing position entries 408, 410 that were saved to a viewing position data structure 406 by operation of the save viewing position control 402, as discussed with reference to FIG. 4).

The viewing position entry markers 508 of FIG. 5 correspond to the viewing position entries 506. Each viewing position entry marker 508 is associated with and represents a respective viewing position entry 506. The viewing position entry markers 508 are illustrated as pins overlaid on the vessel map 502. The viewing position entry markers 508 depict positioning of the viewing positions of the respective viewing position entries 506 relative to the sample vessel represented by the vessel map 502. By presenting the viewing position entries 506 and/or the viewing position entry markers 508, disclosed embodiments may readily communicate to users the quantity, names, and positioning of viewing positions saved to a viewing position data structure. For instance, by observing the viewing position entries 506 of FIG. 5, a user may readily ascertain that six viewing positions have been saved for the sample vessel represented by the vessel map 502. Furthermore, by observing the viewing position entry markers 508 of FIG. 5, a user may readily ascertain that one or more viewing position entries saved in well B5, well C6, well C9 (3 entries), and well D8. From the foregoing, a user may gain an understanding, for example, that multiple features/structures of interest are present in well C9.

In some implementations, the viewing position entries 506 and/or the viewing position entry markers 508 are selectable to facilitate guided navigation to saved viewing positions. For example, the entries of the viewing position entries 506 may comprise selectable list entries, where a user may direct user input to a particular list entry to initiate guided navigation to the viewing position represented by the particular list entry. Similarly, for example, the viewing position entry markers 508 may comprise selectable pins, where a user may direct user input to a particular pin to initiate guided navigation to the viewing position associated with the particular pin.

FIG. 5 depicts an example in which a particular list entry, "Pin 3," of the viewing position entries 506 is highlighted or emphasized. A corresponding particular selectable pin of the viewing position entry markers 508 is also highlighted or emphasized within well C6 of the vessel map 502. In some implementations, the particular list entry and/or the particular selectable pin may become emphasized as shown in FIG. 5 in response to user selection of the particular list entry or the particular selectable pin.

In some instances, in response to selection of the particular selectable pin and/or the particular list entry, guided navigation toward the viewing position associated with the particular selectable pin and/or the particular list entry is initiated (e.g., to a desired viewing position saved as a viewing position entry of a viewing position data structure, as discussed with reference to FIG. 4). For example, FIG. 5 illustrates guidance coordinates 510, which may be configured to guide navigation of the movable stage 118 to cause the one or more viewing or imaging optics of the sample analyzer 100 to become aligned with the viewing position associated with the particular selectable pin and/or the particular list entry. As shown in FIG. 5, the guidance coordinates 510 includes a $\Delta X$ coordinate and a $\Delta Y$ coordinate. The $\Delta X$ coordinate may correspond to a first dimension (x-dimension) guidance coordinate, and the $\Delta Y$ coordinate may correspond to a second dimension (y-dimension) guidance coordinate. For example, in some instances, the $\Delta X$ coordinate conveys a difference between a current x-dimension position of the viewing position marker 504 relative to the vessel map 502 (or a current x-dimension position of the objective 128 relative to the sample vessel) and a target x-dimension position of the target viewing position associated with the particular selectable pin and/or the particular list entry (i.e., "Pin 3"). Similarly, in some instances, the $\Delta Y$ coordinate conveys a difference between a current y-dimension position of the viewing position marker 504 relative to the vessel map 502 (or a current y-dimension position of the objective 128 relative to the sample vessel) and a target y-dimension position of the target viewing position associated with the particular selectable pin and/or the particular list entry (i.e., "Pin 3"). The guidance coordinates 510 may be updated based on updated positioning of the viewing position marker 504 (and corresponding viewing position of the objective 128) as the position of the movable stage 118 is changed. In the example shown, when the ΔX guidance coordinate reaches "0", the x-dimension position of the viewing position marker 504 will correspond to the target x-dimension position associated "Pin 3." Similarly, when the ΔY guidance coordinate reaches "0", the y-dimension position of the viewing position marker 504 will correspond to the target y-dimension position associated "Pin 3." When both the when the ΔX guidance coordinate and the ΔY guidance coordinate reach "0", the position of the viewing position marker 504 will correspond to the target viewing position associated "Pin 3." In some instances, additional or alternative user interface presentations are provided in response to the viewing position marker 504 reaching a target viewing position (e.g., a change in color of the viewing position marker 504, an audible sound, displaying of an icon, etc.).

Thus, a user desiring to revisit the viewing position associated with "Pin 3" may select the list entry corresponding to "Pin 3" or may select the selectable pin corresponding to "Pin 3." The selection may cause the guidance coordinates 510 to display x-dimension and y-dimension differences between the current position of the viewing position marker 504 and a target viewing position associated with "Pin 3." The user may then modify the positioning of the movable stage 118 (and therefore the sample vessel positioned thereon) using the guidance coordinates 510 to bring the viewing position marker 504 into alignment with the target position associated with "Pin 3" by causing the ΔX guidance coordinate and the ΔY guidance coordinate to reach "0."

As noted above, a viewing position entry may comprise information in addition to an x-position and a y-position, such as a z-position indicating focal position/configuration. Accordingly, in some instances, guidance coordinates 510 may comprise a ΔZ guidance coordinate to allow the user to adjust focus of a sample analyzer to accord with a pre-stored focal configuration.

In some instances, a viewing position may include a graphical representation of the sample contained in the sample vessel. The sample in the sample vessel may include live cells. As a non-limiting example, the data may include a capture of the sample in the form of an image. The image may be associated with viewing position marker 504 for a particular list entry of viewing position entries 506. The use of an image above is meant to be a representative example of a graphical representation that is possible.

In some instances, as noted above, a movable stage may be configured to operate in an automated fashion, such as by operating a motorized stage adjuster in accordance with electronic adjustment instructions. Thus, in some implementations, re-navigation to a target viewing position associated with a saved viewing position entry of a viewing position data structure may be automatically performed in response to selection of a representation of the saved viewing position entry (e.g., a selectable pin, a selectable list element, etc.).

The foregoing examples have focused, in at least some respects, on implementations in which the movable stage 118 is adjustable in the x-y dimensions while the objective 128 remains at a stationary position in the x-y dimensions on the sample analyzer during imaging sessions. However, the principles disclosed herein may be applied so long as the objective 128 and the stage 118 are movable relative to one another. For example, the principles discussed herein related to tracking, saving, and/or revisiting of viewing positions may be applicable when the objective is adjustable/movable in the x-y dimensions and the stage or sample vessel remains stationary in the x-y dimensions on the sample analyzer 100 during imaging sessions.

Figure 6:
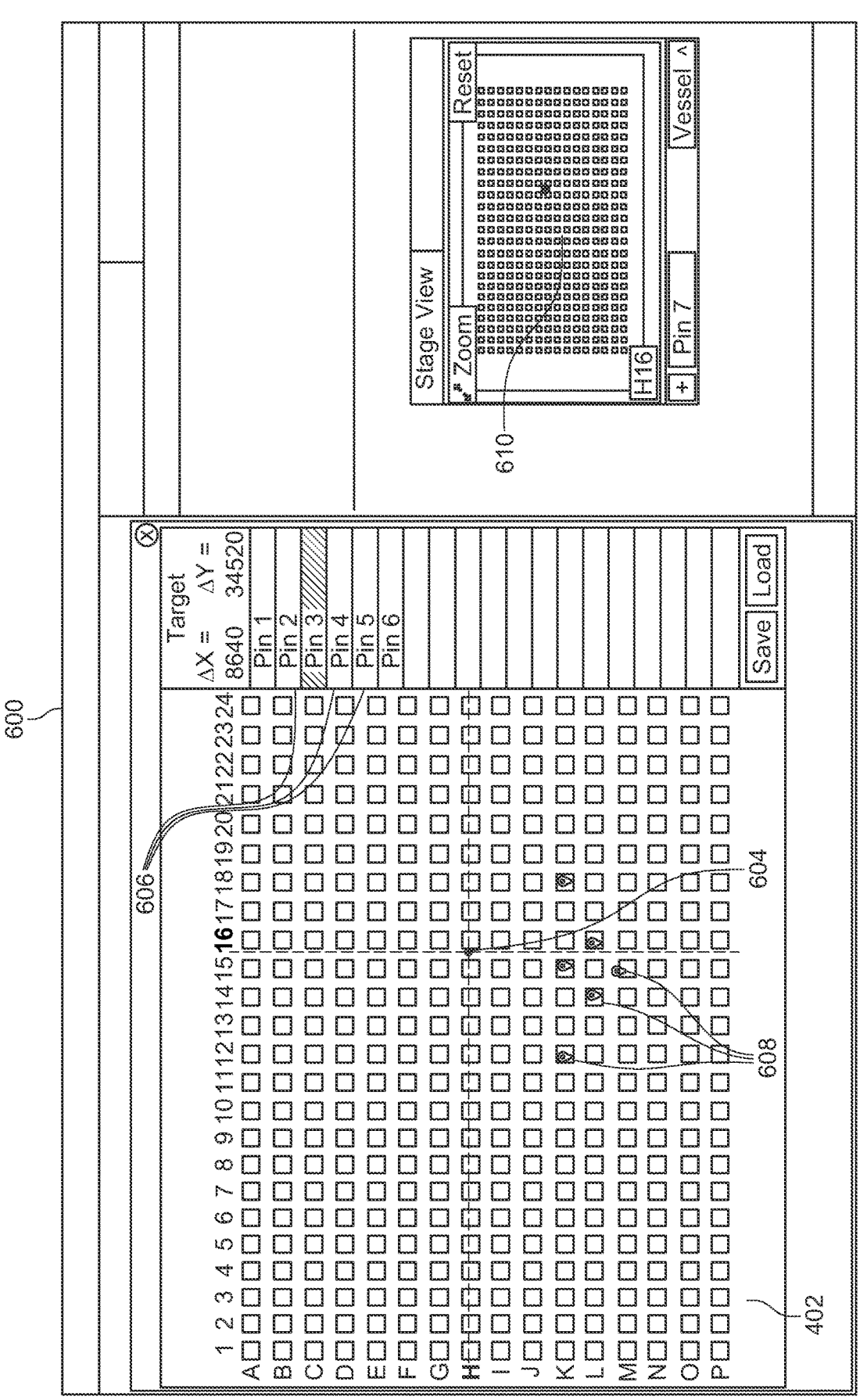

FIG. 6 illustrates an example graphical user interface 600 where a zoomed representation of a vessel map 602 is provided in combination with an un-zoomed representation of a vessel map 610. The zoomed representation of the vessel map 602 is also associated with a viewing position marker 604, viewing position entry markers 608, and viewing position entries 606, which may correspond to similarly named elements heretofore described. The vessel map 610 may similarly include a corresponding viewing position marker.

In some implementations, the vessel map 610 is displayed by default, whereas the zoomed representation of the vessel map 602 is surfaced only in response to selection of a zoom control (e.g., a zoom control 414 as shown in FIG. 4). FIG. 6 also shows that the vessel maps 610 and 602 may be displayed in combination with other microscopy controls and/or information displays. For instance, the graphical user interface 600 of FIG. 6 shows illumination settings/controls, objective/phase ring information, focus information/controls, image capture controls, etc. In some instances, the zoomed vessel map 602 is overlaid on an image viewing window of the graphical user interface 600. In some instances, the zoomed vessel map 602 may be exited in various ways, such as by re-selecting a zoom control, selecting an explicit control for exiting the zoomed representation (e.g., an "X" icon, as shown in the upper-right hand corner of the vessel map shown in FIG. 6), and/or by initiating another sample analysis operation (e.g., activating fluorescence or transmitted light illumination, and/or others). Such functionality may automatically expose/display relevant imagery based upon user input (e.g., activating fluorescence or transmitted light illumination) while de-emphasizing the presentation of the vessel map and/or viewing position marker.

Figure 7:
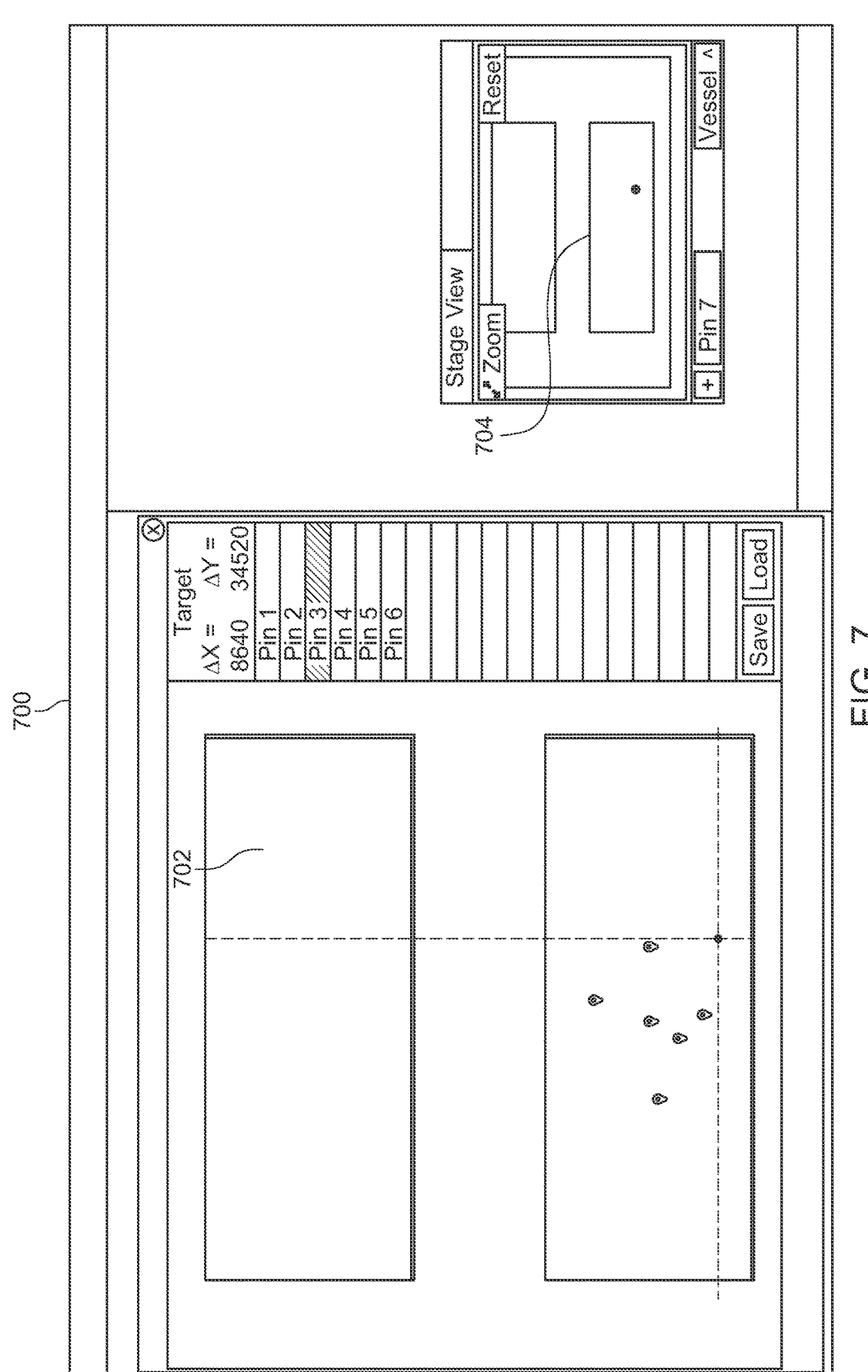

The vessel maps 602 and 610 of FIG. 6 are representative of different sample vessel well configurations as compared to the vessel maps shown and described with reference to FIGS. 2 through 5. For instance, the vessel maps of FIGS. 2 through 5 comprise a 96-well configuration, whereas the vessel maps 602 and 610 of FIG. 6 include a 384-well configuration. FIG. 7 illustrates another example graphical user interface 700 depicting vessel maps 702 and 704 associated with a 2-slide sample vessel configuration. In view of the foregoing, the principles described herein may be applied to sample analysis of various types of sample vessels.

Although the foregoing examples have focused, in at least some respects, on utilizing one or more encoders to obtain positioning information associated with a movable stage, sample, and/or objective, other hardware elements/techniques may be utilized to provide position information usable to facilitate the dynamic presentation of a vessel map as discussed herein. By way of non-limiting example, one or more image sensors may be utilized to capture a relative positioning of an objective to a sample and/or movable stage, and one or more image processing operations may be performed to determine positioning information output based upon the captured imagery. The positioning information output may be used to drive dynamically updated presentation of a vessel map and viewing position marker.

Example Methods for Tracking Viewing Position During Sample Analysis

The following discussion now refers to a number of methods and method acts that may be performed (e.g., utilizing one or more systems that includes components discussed herein, such as processor(s) 102, storage 104, I/O system(s) 110, communication system(s) 112, remote system(s) 114, other components of a sample analyzer 100, etc.). Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 8:
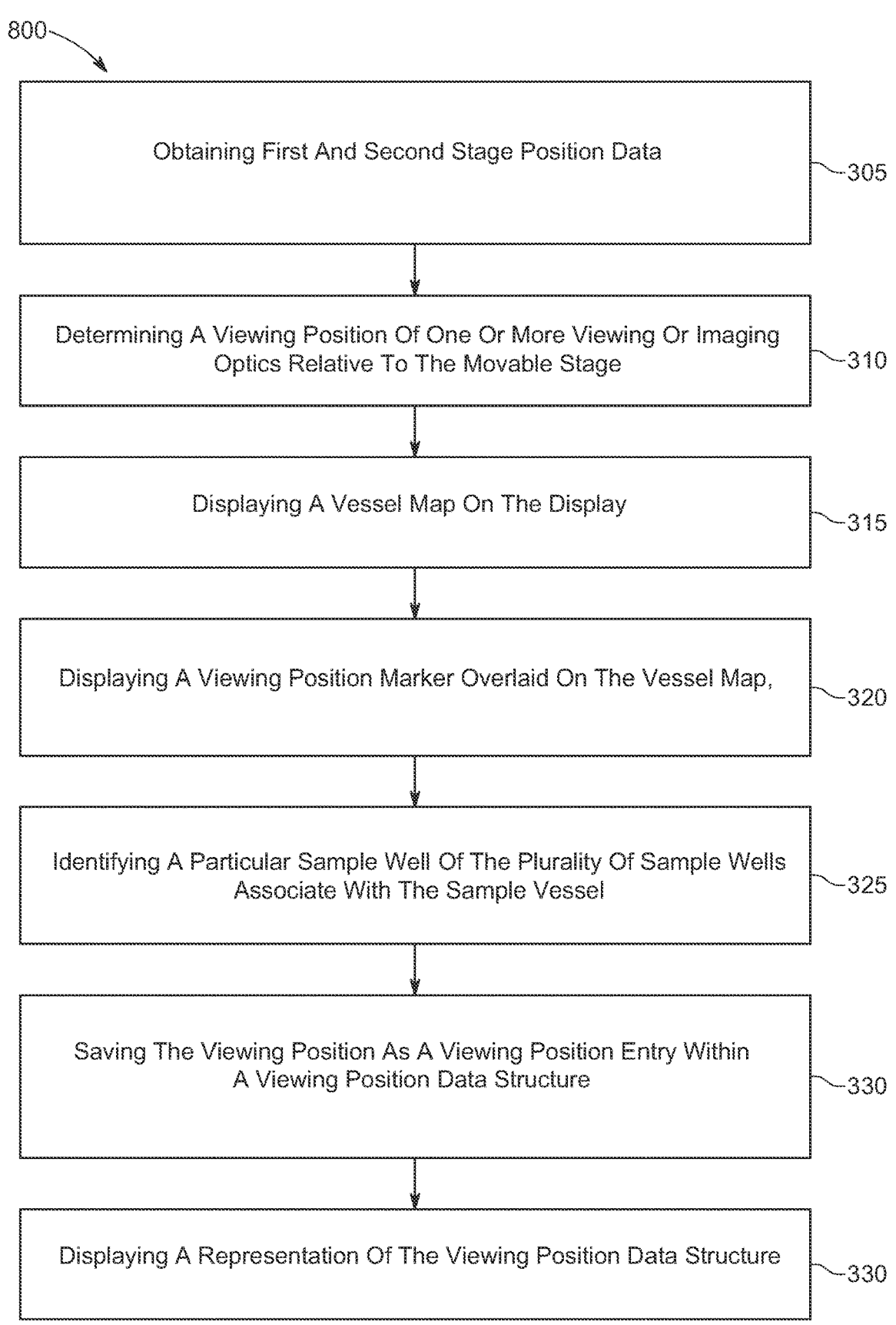
FIG. 8 illustrates an example flow diagram depicting acts associated with tracking viewing position during sample analysis, in accordance with implementations of the present disclosure.

FIG. 8 illustrates an example flow diagram 800 depicting acts associated with tracking viewing position during sample analysis, in accordance with implementations of the present disclosure. The acts associated with flow diagram 800 can incorporate and/or utilize one or more of the components described above with respect to FIGS. 1 through 7. Accordingly, some elements recited in the acts below include parenthetical references to elements described hereinabove for illustrative purposes.

Act 802 of flow diagram 800 of FIG. 8 includes obtaining first and second stage position data, the first stage position data indicating a first position of a movable stage in a first dimension, the second stage position data indicating a second position of the movable stage in a second dimension that is perpendicular to the first dimension. In some implementations, the first position data is obtained via a first position encoder configured to generate first output indicating the first position data of the movable stage in the first dimension. Similarly, in some implementations, the second position data is obtained via a second position encoder configured to generate second output indicating the second position data of the movable stage in the second dimension. Furthermore, in some implementations, the first position encoder or the second position encoder comprises an incremental encoder, such that the first output or the second output indicates translation distance.

In some instances, the first position of the movable stage in the first dimension and/or the second position of the movable stage in the second dimension is/are determined based on a stage calibration. The stage calibration may comprise translating the movable stage to a calibration reference position such that translation distances are measured from the reference position to determine the position of the movable stage.

In some implementations, the first position encoder or the second position encoder comprises an absolute encoder, such that the first output or the second output indicates absolute position.

The first position encoder or the second position encoder may comprise a linear encoder, a rotary encoder (e.g., positioned on a rotatable adjustment knob for translating the movable stage), etc. In some instances, the first position encoder or the second position encoder comprises a magnetic encoder, an optical encoder, or a capacitive encoder.

Act 804 of flow diagram 800 includes, based on the first and second stage position data, determining a viewing position of one or more viewing or imaging optics relative to the movable stage. The viewing position may represent a relative positioning between one or more viewing or imaging optics of a sample analyzer and a sample vessel positioned on the movable stage of the sample analyzer.

Act 806 of flow diagram 800 includes displaying a vessel map on the display, the vessel map comprising a visual representation of a sample vessel associated with the movable stage. In some instances, the vessel map is selected based on user input. The vessel map may depict a plurality of sample wells associated with the sample vessel.

Act 808 of flow diagram 800 includes displaying a viewing position marker overlaid on the vessel map, wherein the viewing position marker indicates the viewing position of the one or more viewing or imaging optics relative to the sample vessel as represented by the vessel map. In some implementations, display of the viewing position marker relative to the vessel map is updated in response to obtaining updated first and/or updated second stage position data indicating an updated first position of the movable stage in the first dimension and/or an updated second position of the movable stage in the second dimension.

Act 810 of flow diagram 800 includes identifying a particular sample well of the plurality of sample wells associated with the sample vessel, the particular sample well positionally corresponding to the viewing position of the one or more viewing or imaging optics relative to the sample vessel. Furthermore, act 812 of flow diagram 800 includes displaying a sample well identifier on the display, the sample well identifier identifying the particular sample well from the plurality of sample wells associated with the sample vessel. Still furthermore, act 814 of flow diagram 800 includes, in response to detecting an image capture operation for capturing an image at the viewing position, automatically embedding the sample well identifier into an image file.

Act 816 of flow diagram 800 includes, in response to activation of a save viewing position control while the one or more viewing or imaging optics are positioned according to the viewing position relative to the sample vessel, saving the viewing position as a viewing position entry within a viewing position data structure. The viewing position data structure may be accessible to enable users to revisit saved viewing positions represented in the viewing position data structure.

Act 818 of flow diagram 800 includes displaying a representation of the viewing position data structure, comprising a representation of each viewing position entry of the viewing position data structure. In some implementations, the representation of the viewing position data structure is displayed in response to activation of a zoom control. A display of a zoomed representation of the vessel map may be provided in combination with the representation of the viewing position data structure. In some implementations, display of the zoomed representation of the vessel map is automatically exited in response to detecting activation of a fluorescence or transmitted light illumination control.

In some implementations, each representation of each viewing position entry of the viewing position data structure comprises a selectable list entry. Additionally, or alternatively, each representation of each viewing position entry of the viewing position data structure may comprise a selectable pin overlaid on the vessel map.

In some implementations, selection of a particular representation of a particular viewing position entry of the viewing position data structure causes display of guidance coordinates configured to facilitate user navigation of the movable stage relative to the one or more viewing or imaging optics to align the one or more viewing or imaging optics with a particular viewing position associated with the particular viewing position entry. The guidance coordinates may comprise a first dimension guidance coordinate and a second dimension guidance coordinate. The first dimension guidance coordinate may comprise a difference between a current first position of the one or more viewing or imaging optics relative to the sample vessel and a desired first position of the one or more viewing or imaging optics relative to the sample vessel in the first dimension. The second dimension guidance coordinate may comprise a difference between a current second position of the one or more viewing or imaging optics relative to the sample vessel and a desired second position of the one or more viewing or imaging optics relative to the sample vessel in the second dimension. The desired first position and the desired second position may be obtained from the selected viewing position entry of the viewing position data structure.

Additional Computer System Details

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-read-able physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

In some implementations, systems of the present disclosure may comprise or be configurable to execute any combination of software and/or hardware components that are operable to facilitate processing using machine learning models or other artificial intelligence-based structures/architectures. For example, one or more processors may comprise and/or utilize hardware components and/or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

The invention claimed is:

1. A sample analyzer, comprising:
a movable stage, comprising:

a vessel holder configured to receive a sample vessel,
a stage position adjuster configured to translate the movable stage in at least a first dimension and a second dimension that is perpendicular to the first dimension
a first position encoder configured to generate first output indicating a first position of the movable stage in the first dimension, and
a second position encoder configured to generate second output indicating a second position of the movable stage in the second dimension; and
an interface configured to display a vessel map that corresponds to a visual representation of the sample vessel and a viewing position marker overlaid on the vessel map, wherein a position of the viewing position marker on the vessel map is determined based on the first output and second output.

2. The sample analyzer of claim 1, wherein the vessel holder comprises a retention member configured to retain the sample vessel at a final position within the vessel holder.

3. The sample analyzer of claim 1, wherein the first position encoder or the second position encoder comprises an incremental encoder, and wherein the first output or the second output indicates translation distance.

4. The sample analyzer of claim 1, wherein the first position encoder or the second position encoder comprises an absolute encoder, and wherein the first output or the second output indicates absolute position.

5. The sample analyzer of any one of claim 1, wherein the first position encoder or the second position encoder comprises a linear encoder.

6. The sample analyzer of claim 1, wherein the first position encoder or the second position encoder comprises a magnetic encoder, an optical encoder, or a capacitive encoder.

7. The sample analyzer of claim 1, wherein the first position encoder or the second position encoder comprises a rotary encoder, wherein the rotary encoder is positioned on a rotatable adjustment knob configured to facilitate translation of the movable stage.

8. The sample analyzer of claim 1, wherein the first output and the second output comprise quadrature output.

9. A sample analyzer, comprising:
a display;
one or more processors; and
one or more hardware storage devices storing instructions that are executable by the one or more processors to configure the sample analyzer to:
obtain first and second stage position data, the first stage position data indicating a first position of a movable stage in a first dimension, the second stage position data indicating a second position of the movable stage in a second dimension that is perpendicular to the first dimension;
based on the first and second stage position data, determine a viewing position of one or more viewing or imaging optics relative to the movable stage;
display a vessel map on the display, the vessel map comprising a visual representation of a sample vessel associated with the movable stage; and
display a viewing position marker overlaid on the vessel map, wherein a position of the viewing position marker on the vessel map is determined based on the viewing position of the one or more viewing or image optics relative to the movable stage.

10. The sample analyzer of claim 9, wherein the instructions are executable by the one or more processors to further configure the sample analyzer to update display of the viewing position marker relative to the vessel map in response to obtaining updated first and/or updated second stage position data indicating an updated first position of the movable stage in the first dimension and/or an updated second position of the movable stage in the second dimension.

11. The sample analyzer of claim 9, wherein the first position of the movable stage in the first dimension and/or the second position of the movable stage in the second dimension is/are determined based on a stage calibration, the stage calibration comprising translating the movable stage to a calibration reference position.

12. The sample analyzer of claim 9, wherein the first position of the movable stage in the first dimension and/or the second position of the movable stage in the second dimension is/are determined based on absolute position measurements.

13. The sample analyzer of any one of claim 9, wherein the vessel map depicts a plurality of sample wells associated with the sample vessel.

14. The sample analyzer of claim 13, wherein the instructions are executable by the one or more processors to further configure the sample analyzer to:

identify a particular sample well of the plurality of sample wells associated with the sample vessel, the particular sample well positionally corresponding to the viewing position of the one or more viewing or imaging optics relative to the sample vessel;

display a sample well identifier on the display, the sample well identifier identifying the particular sample well from the plurality of sample wells associated with the sample vessel; and capture an image at the viewing position, wherein the image is captured in response to detecting an image capture operation; and embed automatically the sample well identifier into an image file.

15. The sample analyzer of any one of claim 9, wherein the instructions are executable by the one or more processors to further configure the sample analyzer to:

in response to activation of a save viewing position control while the one or more viewing or imaging optics are positioned according to the viewing position relative to the sample vessel, save the viewing position as a viewing position entry within a viewing position data structure, the viewing position data structure being accessible to enable users to revisit saved viewing positions represented in the viewing position data structure; and display a representation of the viewing position data structure, comprising a representation of each viewing position entry of the viewing position data structure.

16. The sample analyzer of claim 15, wherein each representation of each viewing position entry of the viewing position data structure comprises a selectable list entry.

17. The sample analyzer of claim 16, wherein selection of a particular representation of a particular viewing position entry of the viewing position data structure causes display of guidance coordinates configured to facilitate user navigation of the movable stage relative to the one or more viewing or imaging optics to align the one or more viewing or imaging optics with a particular viewing position associated with the particular viewing position entry.

18. The sample analyzer of claim 17, wherein the guidance coordinates comprise a first dimension guidance coordinate and a second dimension guidance coordinate, wherein the first dimension guidance coordinate comprises a difference between a current first position of the one or more viewing or imaging optics relative to the sample vessel and a desired first position of the one or more viewing or imaging optics relative to the sample vessel in the first dimension, and wherein the second dimension guidance coordinate comprises a difference between a current second position of the one or more viewing or imaging optics relative to the sample vessel and a desired second position of the one or more viewing or imaging optics relative to the sample vessel in the second dimension, the desired first position and the desired second position being obtained from the selected viewing position entry of the viewing position data structure.

19. The sample analyzer of claim 15, wherein each representation of each viewing position entry of the viewing position data structure comprises a selectable pin overlaid on the vessel map.

20. The sample analyzer of claim 15, wherein the instructions are executable by the one or more processors to configure the sample analyzer to:

in response to activation of a zoom control, (i) display a zoomed representation of the vessel map and (ii) display the representation of the viewing position data structure.

21. The sample analyzer of claim 9, wherein the instructions are executable by the one or more processors to configure the sample analyzer to:

determine a vessel type associated with the sample vessel; and selecting the vessel map from a plurality of stored vessel maps based on the vessel type.

* * * * *